United States Patent
Rao et al.

(10) Patent No.: US 10,547,514 B2
(45) Date of Patent: Jan. 28, 2020

(54) AUTOMATIC CROSSBAR GENERATION AND ROUTER CONNECTIONS FOR NETWORK-ON-CHIP (NOC) TOPOLOGY GENERATION

(71) Applicant: NetSpeed Systems, Inc., San Jose, CA (US)

(72) Inventors: Nishant Rao, San Jose, CA (US); Sailesh Kumar, San Jose, CA (US); Pier Giorgio Raponi, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 0 days.

(21) Appl. No.: 15/923,519

(22) Filed: Mar. 16, 2018

(65) Prior Publication Data
US 2019/0260644 A1    Aug. 22, 2019

Related U.S. Application Data

(60) Provisional application No. 62/634,099, filed on Feb. 22, 2018.

(51) Int. Cl.
*H04L 12/24* (2006.01)
*H04L 12/933* (2013.01)

(52) U.S. Cl.
CPC ............ *H04L 41/12* (2013.01); *H04L 49/101* (2013.01); *H04L 49/109* (2013.01)

(58) Field of Classification Search
CPC ......... H04L 43/00; H04L 43/50; H04L 41/12; H04L 49/109; H04L 49/101
See application file for complete search history.

(56) References Cited

U.S. PATENT DOCUMENTS

| | | | |
|---|---|---|---|
| 4,409,838 A | 10/1983 | Schomberg | |
| 4,933,933 A | 6/1990 | Daily et al. | |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Sharad Rampuria
(74) *Attorney, Agent, or Firm* — Spectrum IP Law Group LLC

(57) ABSTRACT

A system and method for automatic crossbar generation and router connections for Network-on-Chip (NoC) topology generation is disclosed. Aspects of the present disclosure relate to methods, systems, and computer readable mediums for generating topology for a given SoC by significantly improving system efficiency by accurately indicating the best possible positions and configurations for hosts and ports within the hosts, along with indicating system level routes to be taken for traffic flows using the NoC interconnect architecture. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

20 Claims, 15 Drawing Sheets

(56) References Cited

U.S. PATENT DOCUMENTS

| | | |
|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher et al. |
| 5,859,981 A | 1/1999 | Levin et al. |
| 5,991,308 A | 11/1999 | Fuhrmann et al. |
| 5,999,530 A | 12/1999 | LeMaire et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover et al. |
| 6,415,282 B1 | 7/2002 | Mukherjea et al. |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano et al. |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek et al. |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt et al. |
| 8,601,423 B1 | 12/2013 | Philip et al. |
| 8,614,955 B2 | 12/2013 | Gintis et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,210,048 B1 | 12/2015 | Marr et al. |
| 9,223,711 B2 | 12/2015 | Philip et al. |
| 9,244,845 B2 | 1/2016 | Rowlands et al. |
| 9,244,880 B2 | 1/2016 | Philip et al. |
| 9,253,085 B2 | 2/2016 | Kumar et al. |
| 9,294,354 B2 | 3/2016 | Kumar |
| 9,319,232 B2 | 4/2016 | Kumar |
| 9,444,702 B1 | 9/2016 | Raponi et al. |
| 9,471,726 B2 | 10/2016 | Kumar et al. |
| 9,473,359 B2 | 10/2016 | Kumar et al. |
| 9,473,388 B2 | 10/2016 | Kumar et al. |
| 9,473,415 B2 | 10/2016 | Kumar |
| 9,477,280 B1 | 10/2016 | Gangwar et al. |
| 9,529,400 B1 | 12/2016 | Kumar et al. |
| 9,535,848 B2 | 1/2017 | Rowlands et al. |
| 9,568,970 B1 | 2/2017 | Kaushal et al. |
| 9,569,579 B1 | 2/2017 | Kumar |
| 9,571,341 B1 | 2/2017 | Kumar et al. |
| 9,571,402 B2 | 2/2017 | Kumar et al. |
| 9,571,420 B2 | 2/2017 | Kumar |
| 9,590,813 B1 | 3/2017 | Kumar et al. |
| 9,660,942 B2 | 5/2017 | Kumar |
| 9,699,079 B2 | 7/2017 | Chopra et al. |
| 9,742,630 B2 | 8/2017 | Philip et al. |
| 9,858,242 B2 * | 1/2018 | Palmer ............... G06F 15/7825 |
| 10,346,049 B2 * | 7/2019 | White ................... G06F 3/067 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0150094 A1 | 10/2002 | Cheng et al. |
| 2003/0005149 A1 | 1/2003 | Haas et al. |
| 2003/0088602 A1 | 5/2003 | Dutta et al. |
| 2003/0145314 A1 | 7/2003 | Nguyen et al. |
| 2003/0200315 A1 | 10/2003 | Goldenberg et al. |
| 2004/0006584 A1 | 1/2004 | Vandeweerd |
| 2004/0019814 A1 | 1/2004 | Pappalardo et al. |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano et al. |
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |

(56) References Cited

U.S. PATENT DOCUMENTS

| | | |
|---|---|---|
| 2008/0072182 A1 | 3/2008 | He et al. |
| 2008/0120129 A1 | 5/2008 | Seubert et al. |
| 2008/0126569 A1* | 5/2008 | Rhim .................. G06F 15/7825 709/250 |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191814 A1* | 7/2010 | Heddes .................. G06F 15/16 709/206 |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |

(56) References Cited

U.S. PATENT DOCUMENTS

| | | |
|---|---|---|
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063639 A1* | 3/2017 | Raponi ............... H04L 41/145 |
| 2017/0063697 A1 | 3/2017 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Vorkshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

(56) References Cited

OTHER PUBLICATIONS

Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, 4 pages; English translation provided.
Notice of Allowance for for Korean Patent Application No. 10-2016-7019093 dated Sep. 8, 2016, 4 pages.
International Search Report and Written Opinion for PCT/US2014/037902, dated Sep. 30, 2014, 14 pgs.
Office Action for Japanese Patent Application No. 2015-535898 dated Oct. 25, 2016, 4 pages; English translation provided.
Notice of Grant for Japanese Patent Application No. 2015-535898 dated Jan. 17, 2017, 3 pages.
International Search Report and Written Opinion for PCT/US2014/048190, dated Nov. 28, 2014, 11 pgs.
Office Action for Japanese Patent Application No. 2016-516030 dated Aug. 30, 2016, 4 pages; English translation provided.
Decision to Grant for Japanese Patent Application No. 2016-516030 dated Nov. 22, 2016, 6 pages, English translation provided.

* cited by examiner

Prior Art

Prior Art

AUTOMATIC CROSSBAR GENERATION AND ROUTER CONNECTIONS FOR NETWORK-ON-CHIP (NOC) TOPOLOGY GENERATION

CROSS REFERENCE TO RELATED APPLICATION

This U.S. patent application is based on and claims the benefit of domestic priority under 35 U.S.C. 119(e) from provisional U.S. patent application No. 62/634,099, filed on Feb. 22, 2018, the disclosure of which is hereby incorporated by reference herein in its entirety.

TECHNICAL FIELD

Methods and example implementations described herein are generally directed to an interconnect architecture, and more specifically, to an automatic crossbar generation and router connections for Network-on-Chip (NoC) topology generation.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A, 2-D (two dimensional) mesh (as shown in FIG. 1B), and 2-D Taurus (as shown in FIG. 1C) are examples of topologies in the related art. Mesh and Taurus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits).

The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remains sub-optimal and inefficient. A number of innovations to address these problems are described in U.S. patent application Ser. Nos. 13/658,663, 13/752,226, 13/647,557, 13/856,835, 13/723,732, the contents of which are hereby incorporated by reference in their entirety.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. In addition to this, information such as position of various components such as bridges or ports on boundary of hosts, traffic information, chip size information, etc. may be supplied. A NoC compiler (topology generation engine) can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters. Specifications can also be in the form of power specifications to define power domains, voltage domains, clock domains, and so on, depending on the desired implementation.

Placing hosts/IP cores in a SoC floorplan to optimize the interconnect performance can be important. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain performance metrics such as average global communication latency may be used as an objective function to optimize the SoC architecture with the hosts being placed in a NoC topology. Determining substantially optimal host positions that maximizes the system performance metric may involve analyzing the connectivity and inter-communication properties between all hosts and judiciously placing them onto the 2D NoC topology. In case if inter-communicating hosts are placed far from each other, this can leads to high average and peak structural latencies in number of hops. Such long paths not only increase latency but also adversely affect the interconnect bandwidth, as messages stay in the NoC for longer periods and consume bandwidth of a large number of links.

In large-scale networks, efficiency and performance/area tradeoff is of main concern. Mechanisms such as machine learning approach, simulated annealing, among others, provide optimized topology for a system. However, such complex mechanisms have substantial limitations as they involve certain algorithms to automate optimization of the layout network, which may violate the latency constraints of previously mapped flows or the current flow. Therefore, there is a need for systems and methods that improve system efficiency by accurately indicating optimized possible positions and configurations for hosts and ports within the hosts, along with indicating system level routes to be taken for traffic flows using the NoC interconnect architecture. Systems and methods are also required for automatically generating an optimized topology for a given SoC floor plan and traffic specification with an efficient layout.

Therefore, there exists a need for methods, systems, and computer readable mediums for overcoming the above-mentioned issues with existing implementations of generating topology for a given NoC/SoC.

SUMMARY

Methods and example implementations described herein are generally directed to an interconnect architecture, and more specifically, to automatic crossbar generation and router connections for Network-on-Chip (NoC) topology generation.

Aspects of the present disclosure relate to methods, systems, and computer readable mediums for overcoming the above-mentioned issues with existing implementations of generating topology for a given SoC by significantly improving system efficiency by accurately indicating the best possible positions and configurations for hosts and ports within the hosts, along with indicating system level routes to be taken for traffic flows using the NoC interconnect architecture. Further, methods, systems, and computer readable mediums are provided to automatically determine topology choices and selecting an optimal design from among them by implementing a heuristic approach to determine optimal host position in such topology layout, so that the load on various channels may be controlled and to achieve efficiency, low latency, and high performance. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

An aspect of the present disclosure relates to a method for generating a Network-on-Chip (NoC) topology. The method includes the steps of clustering one or more agents into one or more clusters that share at least a similar protocol and at least a type of agent, connecting the one or more clusters to at least a core network in accordance with a process adapted to optimize at least one or more constraints to obtain an optimized logical grid layout, the one or more constraints are selected from any or combination of a performance constraint, an area constraint, a wiring constraint, a clocking (frequency) constraint, a routing constraint, and a power constraint, and generating the Network-on-Chip (NoC) topology at least from the optimized transformed logical grid layout.

In an aspect, the clustering comprises addition of one or more crossbars. In another aspect, the clustering is based at least on any or combination of a connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

In an aspect, the one or more clusters are formed based at least on a native as sent protocol, wherein the core of the one or more clusters is a NoC protocol.

In an aspect, the similar protocol comprises one or more shared bridges and/or one or more sizing buffers.

In an aspect, the crossbars are adapted to determine one or more characteristics associated with the router. The one or more characteristics are selected from any or combination of radix information associated with a router, an arbitration frequency information associated with the router, a position information associated with the router, a clock information associated with the router, and a with information associated with the router.

In an aspect, the crossbars are adapted to determine one or more characteristics associated with the router based on simulated annealing. In an aspect, the simulated annealing is configured to connect a plurality of ports associated with the router and determine total number of ports associated with the router.

In an aspect, the crossbars are adapted to connect with one or more routers utilizing one or more ports associated with a router. In an aspect, the connection minimizes any or combination of total number of ports associated with the router used, total number of clock crossing logic utilized, distance between two routers, wire length for connection the two routers, total number of wires required for connection the two routers, and any logic used for communication between two routers.

In an aspect, the crossbars are adapted to optimize bandwidth associated with a core network to maximize bandwidth.

An aspect of the present disclosure relates to a system to generate a Network-on-Chip (NoC) topology. The system can include a clustering module to cluster one or more agents into one or more clusters that share at least a similar protocol and at least a type of agent, a connection module configured to connect the one or more clusters to at least a core network in accordance with a process adapted to optimize at least one or more constraints to obtain an optimized logical grid layout, and an NoC generation module configured to generating the Network-on-Chip (NoC) topology at least from the optimized transformed logical grid layout.

In an aspect, the one or more constraints are selected from any or combination of a performance constraint, an area constraint, a wiring constraint, a clocking (frequency) constraint, a routing constraint and a power constraint.

In an aspect, the clustering comprises addition of one or more crossbars. In another aspect, the clustering is based at least on any or combination of a connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

In an aspect, the one or more clusters are formed based at least on a native as sent protocol, wherein the core of the one or more clusters is a NoC protocol.

In an aspect, the similar protocol comprises one or more shared bridges and/or one or more sizing buffers.

In an aspect, the crossbars are adapted to determine one or more characteristics associated with the router. The one or more characteristics are selected from any or combination of radix information associated with a router, an arbitration frequency information associated with the router, a position information associated with the router, a clock information associated with the router, and a with information associated with the router.

In an aspect, the crossbars are adapted to determine one or more characteristics associated with the router based on simulated annealing. In an aspect, the simulated annealing is configured to connect a plurality of ports associated with the router and determine total number of ports associated with the router.

In an aspect, the crossbars are adapted to connect with one or more routers utilizing one or more ports associated with a router. In an aspect, the connection minimizes any or combination of total number of ports associated with the router used, total number of clock crossing logic utilized, distance between two routers, wire length for connecting the two routers, total number of wires required for connecting the two routers, and any logic used for communication between two routers.

In an aspect, the crossbars are adapted to optimize bandwidth associated with a core network to maximize bandwidth.

An aspect of the present disclosure relates to a non-transitory computer readable storage medium storing instructions for executing a process. The instructions include the steps of clustering one or more agents into one or more clusters that share at least a similar protocol and at least a type of agent, connecting the one or more clusters to at least a core network in accordance with a process adapted to optimize at least one or more constraints to obtain an optimized logical grid layout, the one or more constraints are selected from any or combination of a performance constraint, an area constraint, a wiring constraint, a clocking (frequency) constraint, a routing constraint, and a power constraint, and generating the Network-on-Chip (NoC) topology at least from the optimized transformed logical grid layout.

The foregoing and other objects, features and advantages of the example implementations will be apparent and the following more particular descriptions of example implementations as illustrated in the accompanying drawings wherein like reference numbers generally represent like parts of exemplary implementations of the application.

DETAILED DESCRIPTION

Figure 1A:
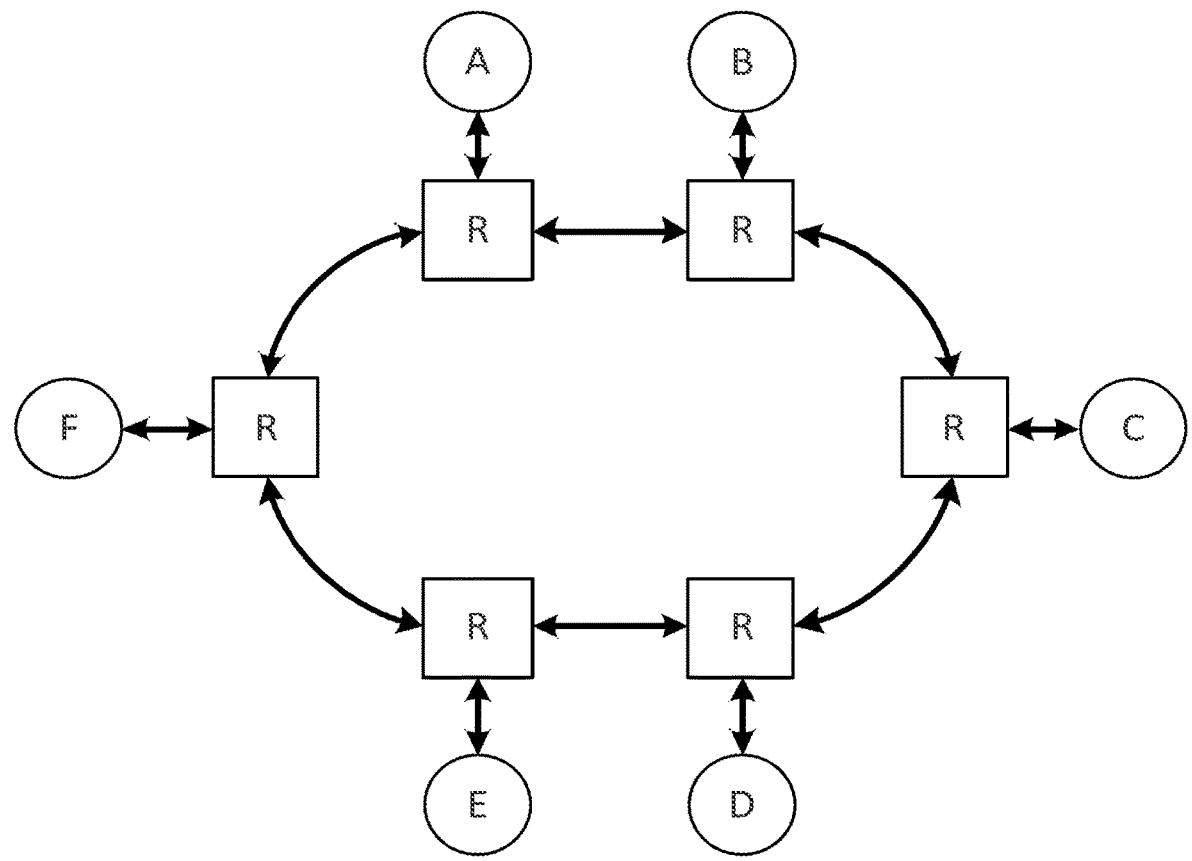
FIGS. 1A, 1B, 1C, and 1D illustrate examples of Bidirectional ring, 2D Mesh, 2D Taurus, and 3D Mesh NoC Topologies.
Figure 1B:
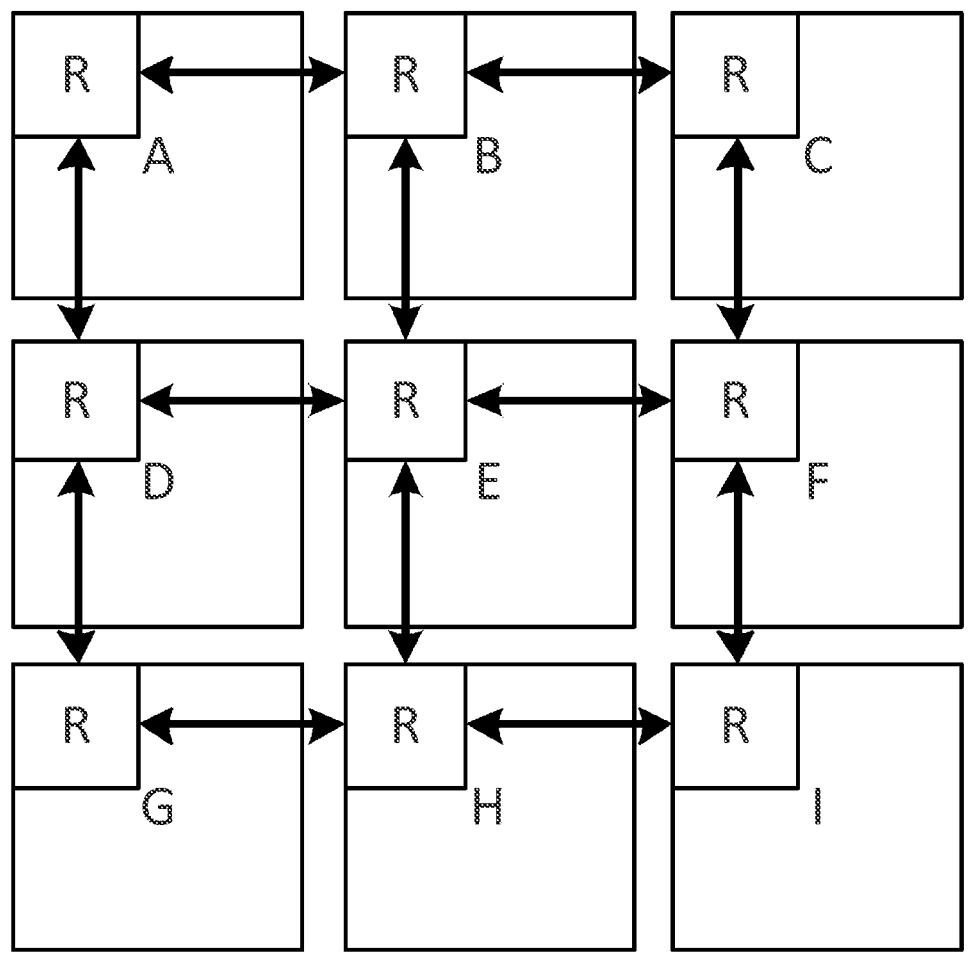
Figure 1C:
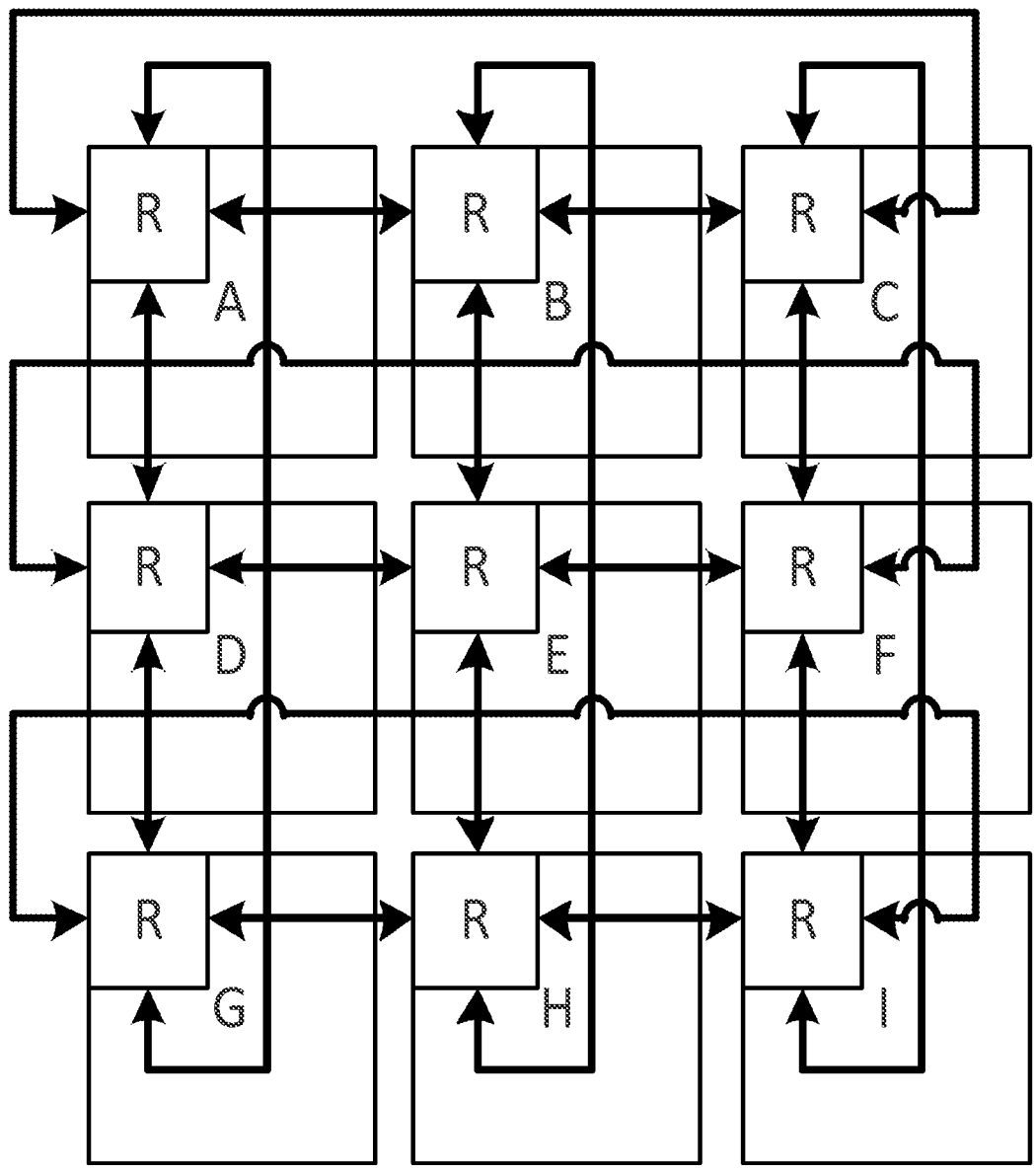
Figure 1D:
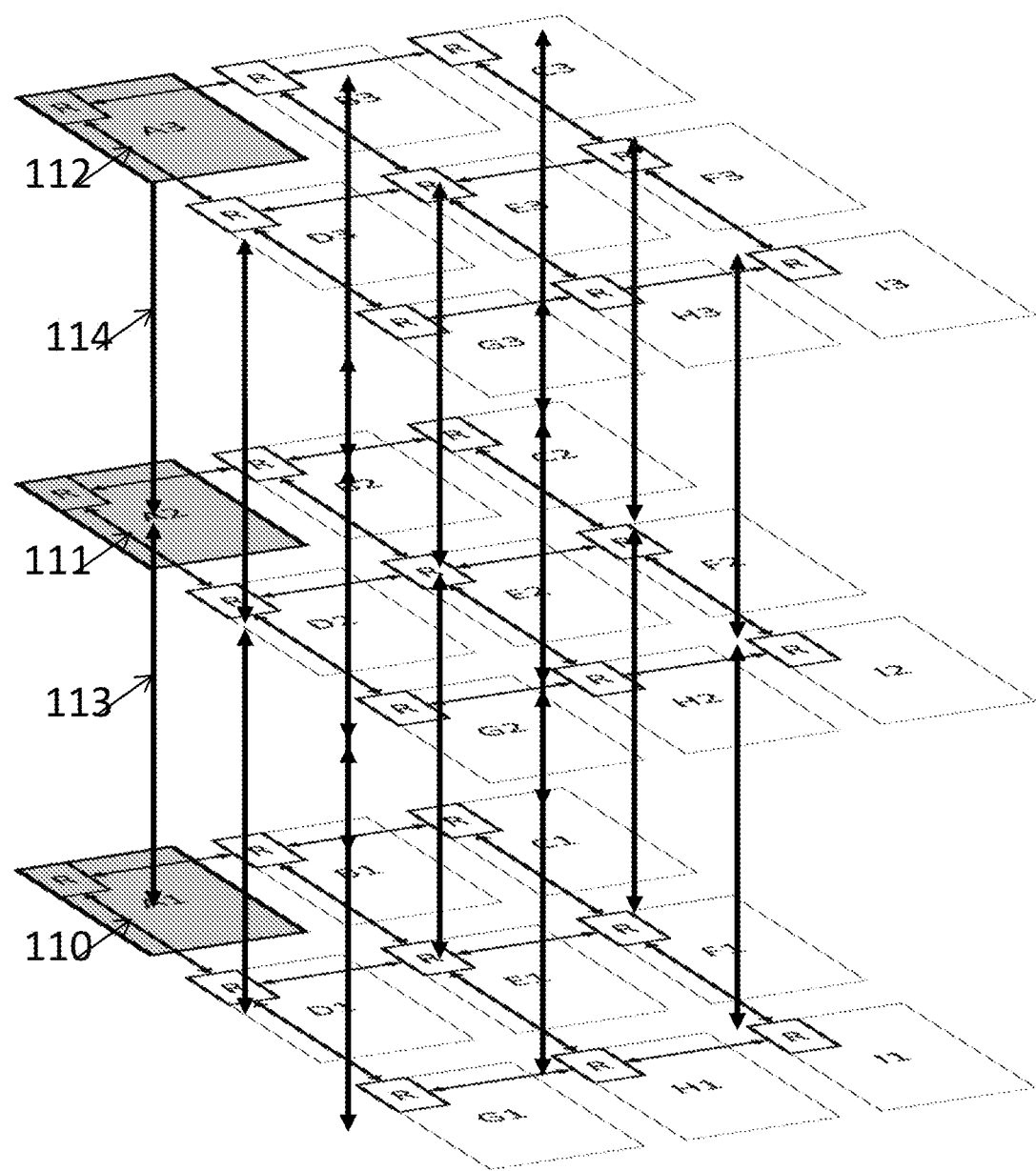
Figure 2A:
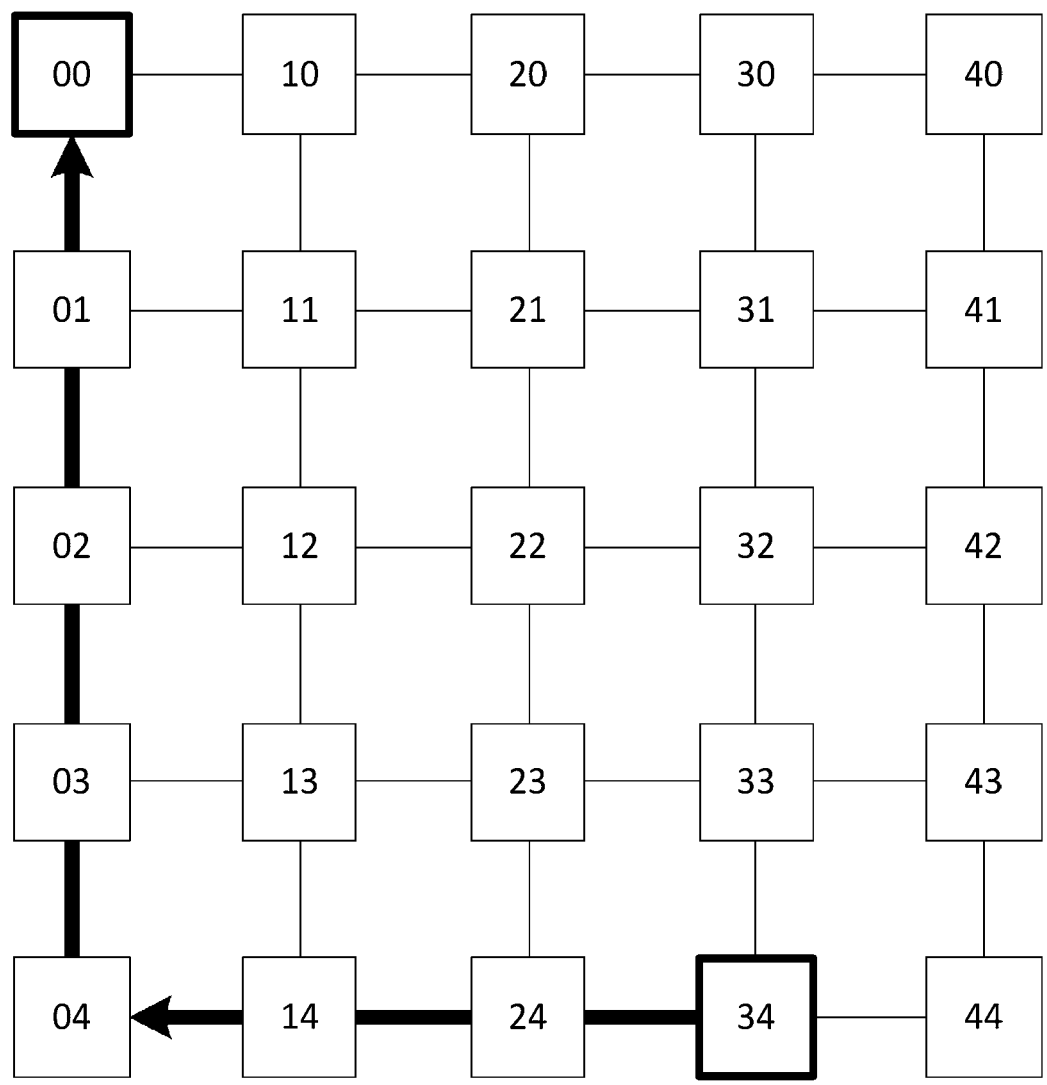
FIG. 2A illustrates an example of XY routing in a related art two dimensional mesh.
Figure 2B:
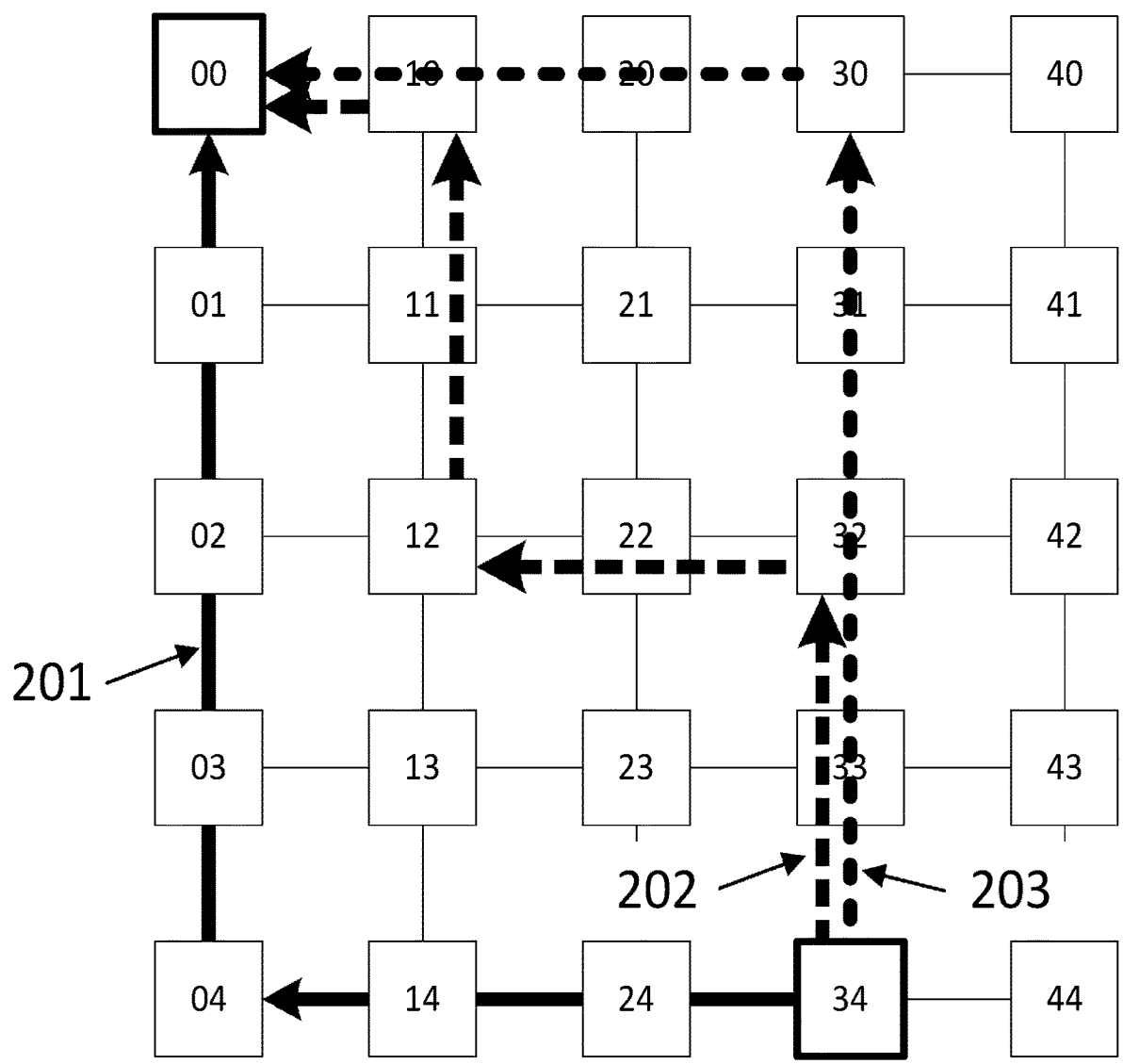
FIG. 2B illustrates three different routes between a source and destination nodes.
Figure 3A:
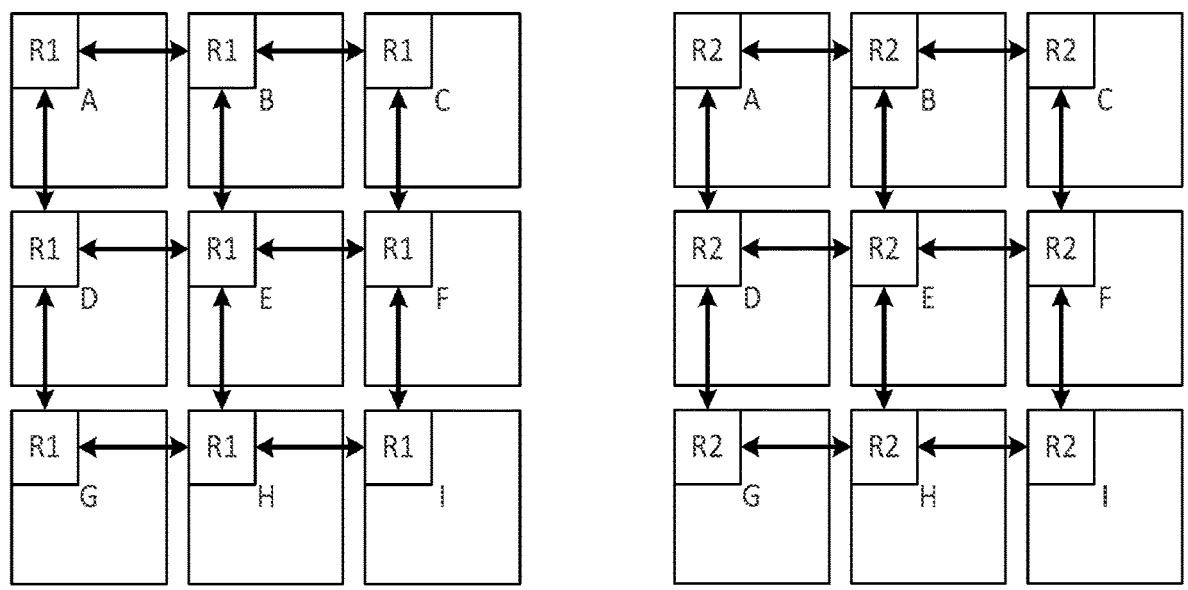
FIG. 3A illustrates an example of a related art two layer NoC interconnect.
Figure 3B:
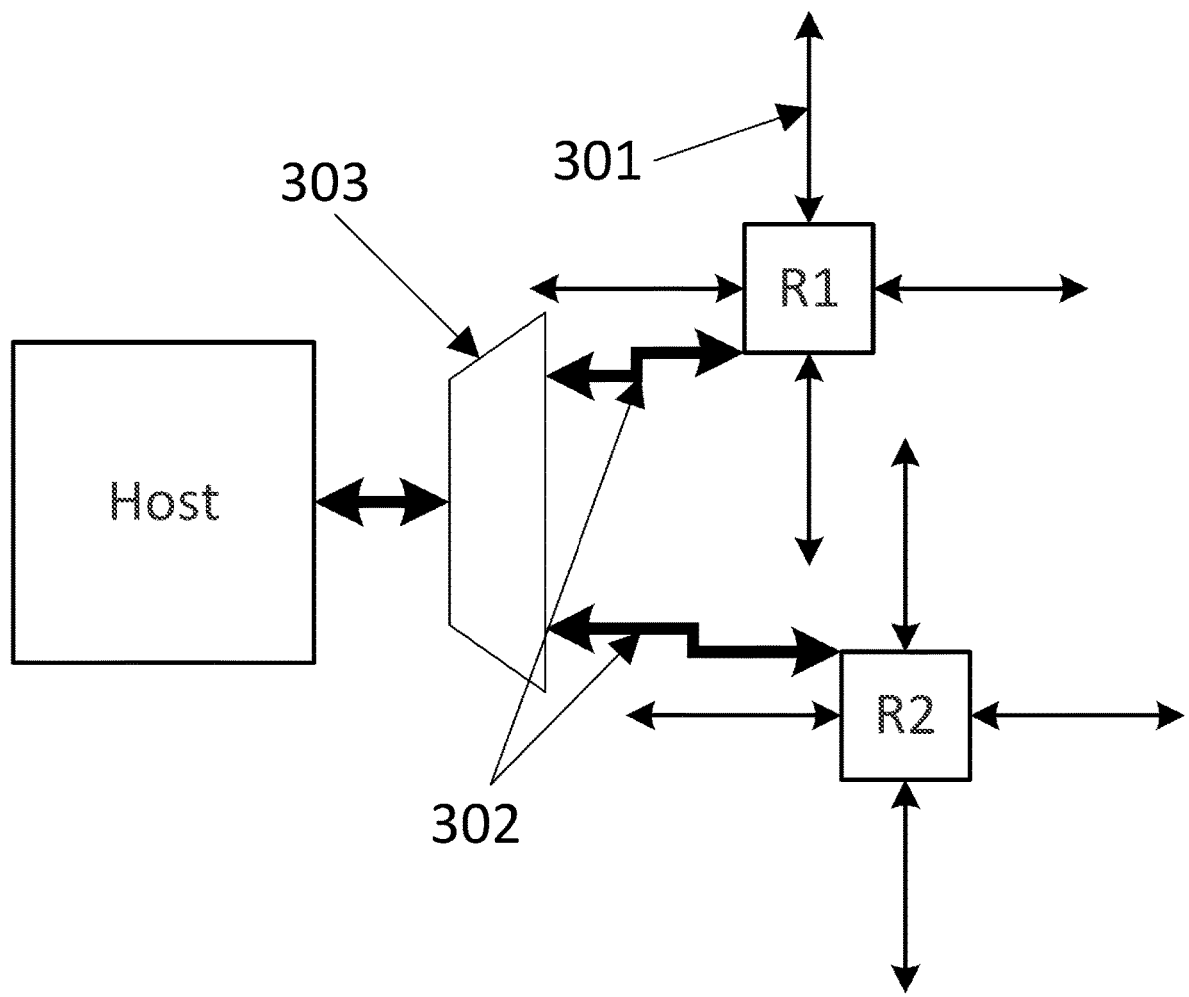
FIG. 3B illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to an interconnect architecture, and more specifically, to automatic crossbar generation and router connections for Network-on-Chip (NoC) topology generation.

Aspects of the present disclosure relate to methods, systems, and computer readable mediums for overcoming the above-mentioned issues with existing implementations of generating topology for a given SoC by significantly improving system efficiency by accurately indicating the best possible positions and configurations for hosts and ports within the hosts, along with indicating system level routes to be taken for traffic flows using the NoC interconnect architecture. Further, methods, systems, and computer readable mediums are provided to automatically determine topology choices and selecting an optimal design from among them by implementing a heuristic approach to determine optimal host position in such topology layout, so that the load on various channels may be controlled and to achieve efficiency, low latency, and high performance. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

An aspect of the present disclosure relates to a method for generating a Network-on-Chip (NoC) topology. The method includes the steps of clustering one or more agents into one or more clusters that share at least a similar protocol and at least a type of agent, connecting the one or more clusters to at least a core network in accordance with a process adapted to optimize at least one or more constraints to obtain an optimized logical grid layout, the one or more constraints are selected from any or combination of a performance constraint, an area constraint, a wiring constraint, a clocking (frequency) constraint, a routing constraint, and a power constraint, and generating the Network-on-Chip (NoC) topology at least from the optimized transformed logical grid layout.

In an aspect, the clustering comprises addition of one or more crossbars. In another aspect, the clustering is based at least on any or combination of a connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

In an aspect, the one or more clusters are formed based at least on a native as sent protocol, wherein the core of the one or more clusters is a NoC protocol. In an aspect, In an aspect, the similar protocol comprises one or more shared bridges and/or one or more sizing buffers.

In an aspect, the crossbars are adapted to determine one or more characteristics associated with the router. The one or more characteristics are selected from any or combination of radix information associated with a router, an arbitration frequency information associated with the router, a position information associated with the router, a clock information associated with the router, and a with information associated with the router.

In an aspect, the crossbars are adapted to determine one or more characteristics associated with the router based on simulated annealing. In an aspect, the simulated annealing is configured to connect a plurality of ports associated with the router and determine total number of ports associated with the router.

In an aspect, the crossbars are adapted to connect with one or more routers utilizing one or more ports associated with a router. In an aspect, the connection minimizes any or combination of total number of ports associated with the router used, total number of clock crossing logic utilized, distance between two routers, wire length for connection the two routers, total number of wires required for connection the two routers, and any logic used for communication between two routers.

In an aspect, the crossbars are adapted to optimize bandwidth associated with a core network to maximize bandwidth.

An aspect of the present disclosure relates to a system to generate a Network-on-Chip (NoC) topology. The system can include a clustering module to cluster one or more agents into one or more clusters that share at least a similar protocol and at least a type of agent, a connection module configured to connect the one or more clusters to at least a core network in accordance with a process adapted to optimize at least one or more constraints to obtain an optimized logical grid layout, and an NoC generation module configured to generating the Network-on-Chip (NoC) topology at least from the optimized transformed logical grid layout.

In an aspect, the one or more constraints are selected from any or combination of a performance constraint, an area constraint, a wiring constraint, a clocking (frequency) constraint, a routing constraint, and a power constraint.

In an aspect, the clustering comprises addition of one or more crossbars. In another aspect, the clustering is based at least on any or combination of a connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

In an aspect, the one or more clusters are formed based at least on a native as sent protocol, wherein the core of the one or more clusters is a NoC protocol.

In an aspect, the similar protocol comprises one or more shared bridges and/or one or more sizing buffers.

In an aspect, the crossbars are adapted to determine one or more characteristics associated with the router. The one or more characteristics are selected from any or combination of radix information associated with a router, an arbitration frequency information associated with the router, a position information associated with the router, a clock information associated with the router, and a with information associated with the router.

In an aspect, the crossbars are adapted to determine one or more characteristics associated with the router based on simulated annealing. In an aspect, the simulated annealing is configured to connect a plurality of ports associated with the router and determine total number of ports associated with the router.

In an aspect, the crossbars are adapted to connect with one or more routers utilizing one or more ports associated with a router. In an aspect, the connection minimizes any or combination of total number of ports associated with the router used, total number of clock crossing logic utilized, distance between two routers, wire length for connection the two routers, total number of wires required for connection the two routers, and any logic used for communication between two routers.

In an aspect, the crossbars are adapted to optimize bandwidth associated with a core network to maximize bandwidth.

An aspect of the present disclosure relates to a non-transitory computer readable storage medium storing instructions for executing a process. The instructions include the steps of clustering one or more agents into one or more clusters that share at least a similar protocol and at least a type of agent, connecting the one or more clusters to at least a core network in accordance with a process adapted to optimize at least one or more constraints to obtain an optimized logical grid layout, the one or more constraints are selected from any or combination of a performance constraint, an area constraint, a wiring constraint, a clocking (frequency) constraint, a routing constraint, and a power constraint, and generating the Network-on-Chip (NoC) topology at least from the optimized transformed logical grid layout.

The topology of NoC interconnects to connect various SoC components can be used to achieve efficiency, low latency, and high performance. The number of topology choices for a NoC depends largely on the placement of various components on a chip and the connectivity requirements between these components. The example systems and methods are aimed at automatically determining these topology choices and selecting an optimal one from among them For some example implementations, a method to propagate flits using a fabric of a Network on Chip (NoC) is utilized. The method includes receiving the flits forwarded from an upstream router into an intended input virtual channel (VC) of a plurality of input VCs associated with an input port. The flits may be associated with packets originated from a first Intellectual Property (IP) core and to be forwarded to a second IP core. The flits can be stored in a virtual channel storage associated with the intended input virtual channel. Link width conversion may be performed based on the width of the input flits being different from the width of an output port.

Figure 4A:
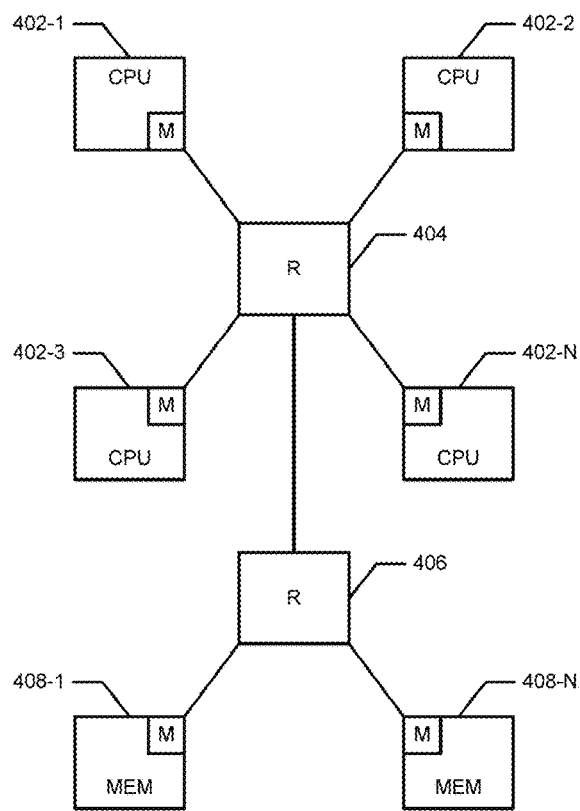
FIG. 4A illustrates a number of system components and the connectivity between them.

FIG. 4A illustrates a number of system components and the connectivity between them. In an example NoC, as shown in FIG. 4A, a system includes master ports inside CPUs (402-1, 402-2, 402-3 . . . 402-N) which issue requests and slave ports inside memory (MEMs) (408-1 . . . 402-N) that receives requests or provides response to the requests received. Normally, the CPUs (402-1, 402-2, 402-3 . . . 402-N) provide requests through one or more routers, say for example Router R 404, and MEMs (408-1, . . . 402-N) that receive requests or provide response to the requests received through one or more routers, say for example Router R 406.

The Router R 406 receives requests in the form of a legitimate protocol for example, NoC protocol. When the request is received it is to be received in specific pre-defined NoC format, and at an output there is conversion of non-NoC format protocol to a native protocol format understandable by the ports that receive requests or provide response.

In related art implementations there is always an overhead in terms of latency and areas in NoC systems as shown in FIG. 4A. The overhead may result from providing multiple flops for group conversions, while converting protocols or due to the presence of multiple routers and their connections, and so on.

Instead of having multiple conversions block or a separate conversion block for each of the requests, example implementations described herein can involve sharing a conversion block or a common conversion block is provided for each of the requests or CPUs so that the overhead can be reduced substantially. Thus, there can be a mechanism that reduces the requirements of number of routers in the system and by which M inputs coming in can be converted into N outputs going out to the NoC directly. Each of these CPUs can communicate to the mechanism/block. Example implementations can involve a mechanism of sharing a common interfaces or bridge module into input interfaces (crossbar) that satisfies the requirements of reducing the number of requirements of routers in the system to reduce the overall overhead of the system. Example implementations can involve mechanisms to decide how many of these conversion blocks would be required through software implementations.

Figure 4B:
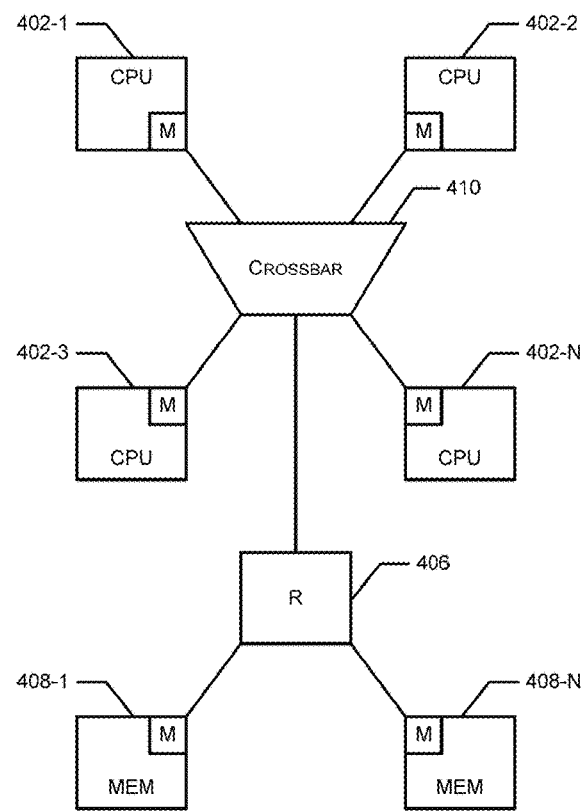
FIG. 4B-4D illustrates a number of system components and the connectivity between them using crossbars for optimization.
Figure 4C:
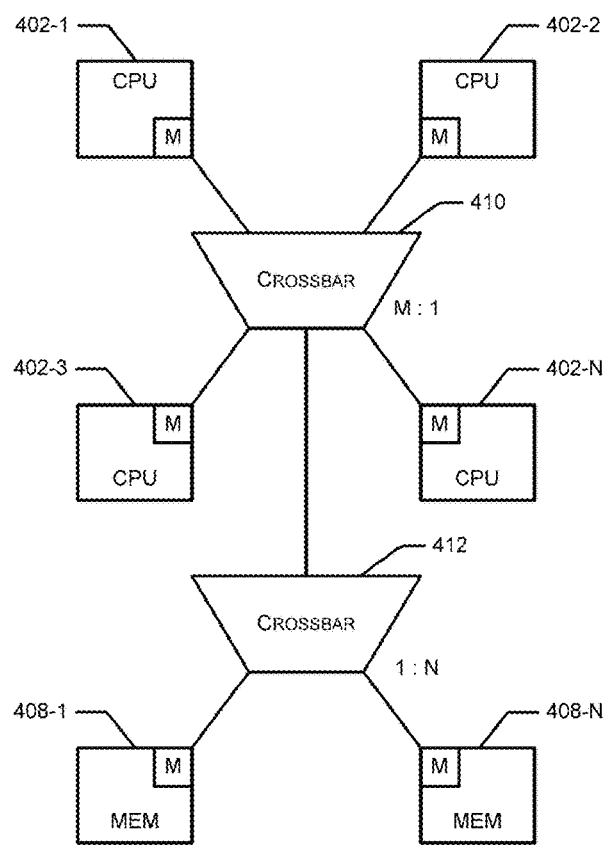
Figure 4D:
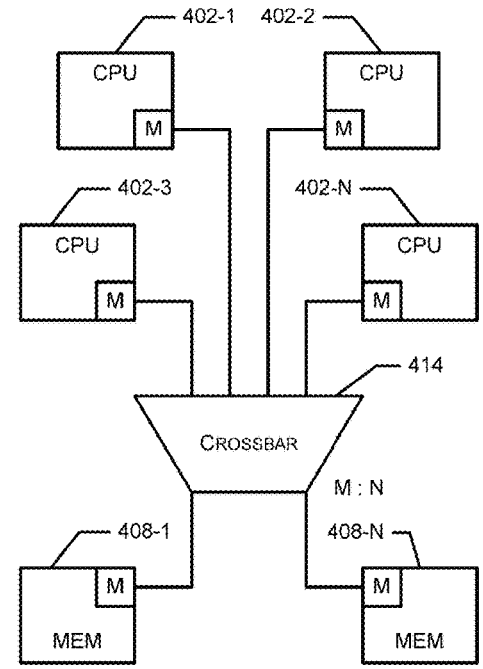

FIGS. 4B-4D illustrates a number of system components and the connectivity between them using crossbars for optimization, in accordance with an example implementation. FIGS. 4B-4D illustrates various arrangements of crossbars in the system, for example as shown in FIG. 4A, to achieve optimization. Thus, considering FIG. 4A, since multiple CPUs can send requests to a router which communicates with another router having multiple CPUs sending requests, and there can be many other routers and CPUs in a system which makes the overall system bulkier and affecting the power, performance and area requirements.

Figure 5:
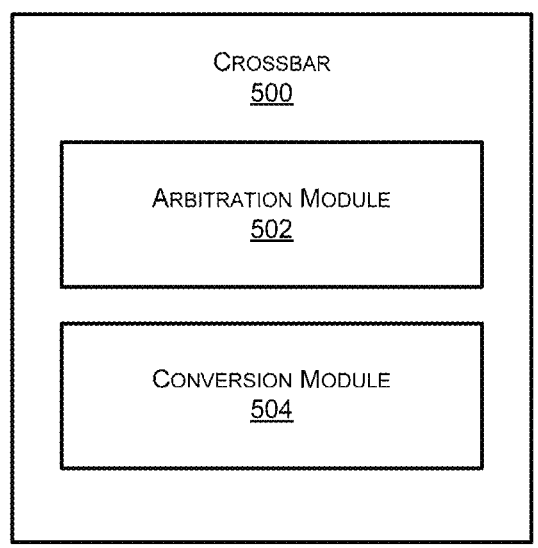
FIG. 5 illustrates an exemplary crossbar unit used in optimization for generating a Network-on-Chip (NoC) topology.

To address such drawbacks, example implementations involve an optimization of the system. In example implementations, a single block (hereafter referred to as "crossbar" or "crossbars") having an arbitration block and a conversion block (as shown in FIG. 5) which can receive N inputs coming in and M outputs going out to the NoC is proposed. It can be configured to operate on a protocol for routers. There can be different combinations that can be utilized and/or implemented on how the crossbar functions.

In an example implementation, a larger network can have a single crossbar. However, in this case the crossbar may need clocks as well. The cross bar is used to convert communications from other protocols into a NoC native protocol. The usage of cross bar is for saving protocol conversion logic at different points of the NoC as a tradeoff for operating performance.

Accordingly, as shown in FIG. 4B, a single crossbar is used in the system as shown in FIG. 4A. The router R 404 as shown in FIG. 4A is replaced by a crossbar 410 as shown in FIG. 4B which is an example of a crossbar with M inputs to generate 1 output i.e., 4 inputs and 2 outputs.

FIG. 4C illustrates two crossbars 410 and 412 replacing the two routers 404 and 406 as shown in FIG. 4A, which are example of crossbars with M inputs to generate 1 output and 1 output being received as input to another crossbar distributing it to N outputs.

FIG. 4D illustrates a single crossbar 414 replacing both the two routers 404 and 406 as shown in FIG. 4A, which is an example of M inputs to generate N outputs.

Accordingly, with reference to FIGS. 4B-4D, the present application by the usage of crossbar reduces the requirements of the plurality of routers in the system and thereby reduces the overhead of the routers.

In example implementations, since the conversion according to crossbars 410, 412, 414, and 416 can be all in a native protocol format, there is no special conversion or packetizing format required. The crossbars can operated to have weights for each input and depending on which inputs are active the system allocates weight and then deiced the number of outputs to be generated (e.g., 2 inputs and 1 output or 2 inputs and 2 outputs).

It may be appreciated that, the crossbar can be configured to either covert the protocol from original protocol to NoC native protocol or alternatively just forwards the NoC native protocol to the NoCs.

In an example implementation, software is utilize to determine and implement an optimized approach/network to implement the cross bar. There are various factors that the software may decide which the best network. The factors can include, but are not limited to, a distance between two NoCs, clock frequencies, data widths, bandwidth of each block (throughput), and so on.

Accordingly, based on the above, NoC optimization is achieved through an algorithm called simulated annealing where one can start off with the first discrete network as possible. In an example, suppose that there are 4-5 bridges wherein each bridge has one to one cross bars connected thereto. Now there is need to optimize in terms of performance for the end to end network and system space. There are six crossbars. Example implementations optimize the performance by combining the common CPUs or inputs into a single crossbar and thereby perform a new cost computation which is dependent on how much area is consumed after combining, distance, width, clock frequency etc. For example, the initial cost may be set at a value (1000) then the cost after optimization may be reduced from such value. The same process is repeated for other combinations to find the cheapest solution of optimization.

FIG. 5 illustrates an example crossbar unit 500 used in optimization for generating a Network-on-Chip (NoC) topology. As shown in FIG. 5 the crossbar unit 500 include two modules an arbitration module 502 and a conversion module 504.

In an embodiment, the proposed common interfaces or bridge module or crossbar essentially includes two blocks, an arbitration block and a conversion block. In an example implementation, the crossbar will pick requests and generate an output based on a pre-defined fairness schemes. For example, if there are two available output items then the arbitration block can allocate an output on one of the two output lines/ports based on some fairness schemes. In an example implementation, the arbitration block can also assign weights to the inputs and outputs. It may have round robin weighting mechanism to assign weights. For example, the input has certain weights like 3, 2, 1 etc.

In an example implementation, the weight can be assigned to each host and port thereof based multiple parameters. In an example implementation, the weight can be computed based on attributes such as cost functions, latency, interconnect bandwidth, traffic attributes, among other like parameters. According to one example implementation, instead of assigning weights to each port and/or host, the weights can be computed for and assigned to a subset of ports/hosts. In an example, a host and/or a port that has the highest latency can be assigned the lowest weight and the host/port with the lowest latency and highest bandwidth can be assigned the highest weight. The weight assignment can also be opposite wherein a host/port with the higher latency is allocated a higher weight.

In an example implementation, based on the weights assigned to one or more hosts and ports, a host or a port within a host (e.g., x1) can be selected for relocation consideration and accordingly the outputs can be also decided. Assuming that x1 is the port with lowest weight assigned compared to other ports in a system (e.g., due to having the highest latency), relocation of the port within the host may be conducted to improve the efficiency of the SoC and also enhance the latency and bandwidth-based performance. In an example implementation, a weight threshold can also be defined by the system, wherein the implementation is carried out only for those hosts/ports that have their weights lesser than the defined weight threshold. According to another example implementation, hosts and/or ports can also be identified for potential relocation until a given number count (e.g., J) is reached, wherein J=0 in the first iteration. For instance, if there are five hosts in a system and each host has two ports, there are a total of 15 components/ports whose relocations is possible (five components and ten ports), and therefore J can indicate the number of times the relocation of these components/ports needs to be executed based on the weight of the component/host or the port. Besides the example implementations described above, other implementations can also be carried out to select the ports and/or hosts that need to be relocated and the number of times the process needs to be carried out. The details of the weight assignment and optimization according to weight are explained below in FIGS. 6A-6C.

In an example implementation, the crossbar can be implemented for performing round robin arbitration and an adaptive routing control. The present application performs arbitration and a routing control which are nucleus functions of the crossbar.

In an example implementation, the arbitration unit can output two kinds of arbitration selection signals which are results of arbitration and a status signal status representing arbitratibility. Two kinds of arbitration selection signals can be classified into an arbitration selection sequential signal which drives the result of arbitration after storing it in the storage by using a clock, and an arbitration selection combinational signal which is a signal directly before storing the result of arbitration in the storage. The arbitration selection combinational signal can know the result of arbitration one clock earlier than the arbitration selection sequential signal.

In an example implementation, the round robin arbitration method can offer the fairness for each state, and prevents starvation on in which any one state cannot be eternally arbitrated.

Figure 6A:
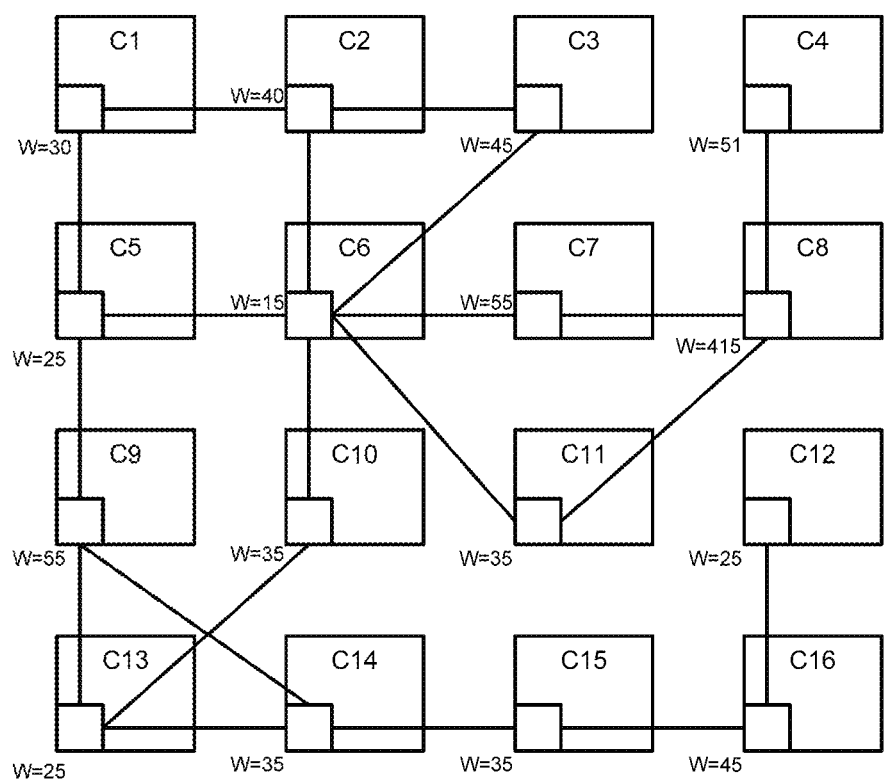
FIGS. 6A-6C illustrates relocation and repositioning of a port of a given host while optimization for generating a Network-on-Chip (NoC) topology in accordance with an example implementation.
Figure 6B:
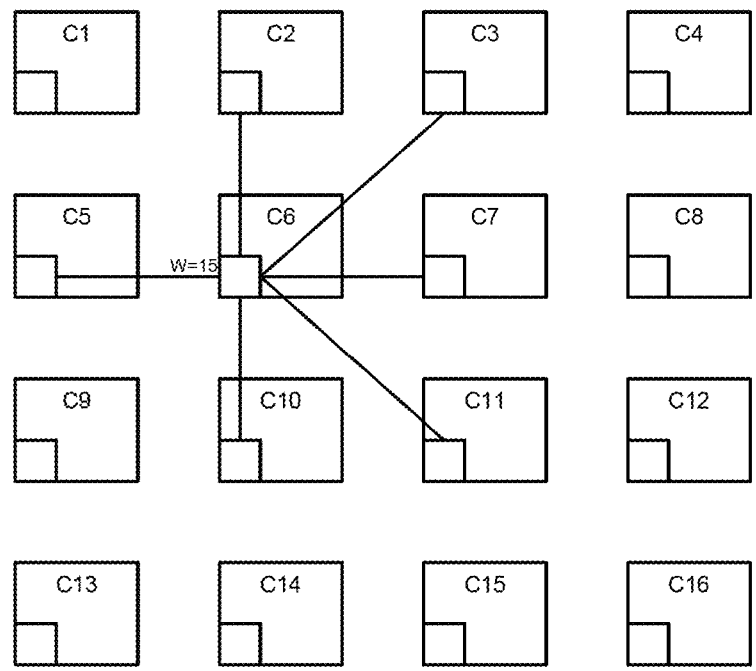
Figure 6C:
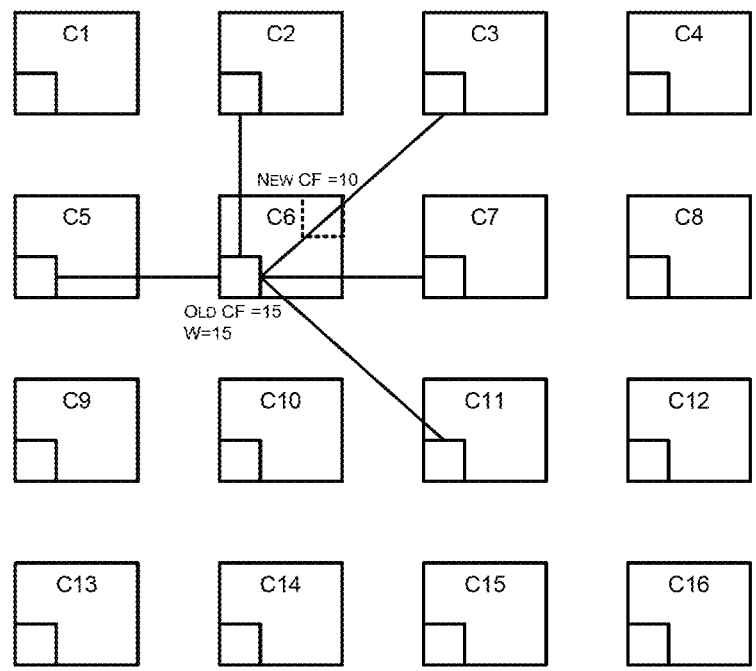

FIGS. 6A-6C illustrates relocation and repositioning of a port of a given host while optimization for generating a Network-on-Chip (NoC) topology in accordance with an example implementation. In an example implementation, FIGS. 6A, 6B, and 6C illustrate relocation and repositioning of a port of a given host based on optimization of crossbars in accordance with an example implementation. Accordingly, a bridge is connected to routers which are then connected to a best possible router. The cost can be decided based on the cost associated with the routers, latency, etc.

FIG. 6A illustrates multiple components/hosts C1-C16, which are operatively coupled with one or more other components/hosts. For instance, host C1, through its respective port, is coupled with ports of hosts C2 and C5. Similarly, C6 is coupled with the ports of C5, C10, C2, C3, C11, and C7. In an example implementation, each port can be assigned a weight as illustrated in FIG. 6A. In the present example, the ports are relocated within their respective hosts and the positions of the hosts are static. Therefore weights are only assigned to the ports. The port of host C6 has the smallest weight of 0.15 among all of the other ports, which may signify that the port of host/component C6 has the highest latency and therefore can be picked up for a potential relocation. Selection of the port of component C6 to be relocated is illustrated in FIG. 6B.

FIG. 6B illustrates all the hosts that the port of C6 is operatively coupled with, which include C2, C3, C5, C7, C10, and C11. Based on the probability function f1 as pre-defined, one host can now be selected, which the present example assumes to be C3. Once the host C3 has been selected, a cost function for the port of C6 is computed assuming that relocation of port of C6 is proposed.

FIG. 6C illustrates the old cost function of the port of C6 before the relocation, which is computed as 0.15, and further computes the new cost function assuming relocation of the port of C6 to top right of the host C6. As illustrated in FIG. 6C, the new cost function is 0.10, and therefore, in accordance with probability function f2, as the value from new cost function is less than the value from the old cost function, the port can be relocated with renewed connections of the relocated port of C6 with all other operatively coupled hosts. This process can be continued until the time the most optimized set of positions for components and ports have been achieved.

According to one example implementation, once the host positions and orientations are determined in the SoC, the automatic NoC topology generation process can then include allocation of routers and NoC channels to form the NoC topology. The routers can be instantiated to connect the ports of the hosts forming the first set of arbitration points, wherein the ports are connected to the nearest routers. After the router-port assignment, there may be one router per host port. In a grid based design methodology, the routers may be instantiated in a grid cell in which the ports reside. Subsequently, additional routers and NoC channels can be allocated to provide connectivity such that a more optimized NoC topology automatically forms. When system traffic flows (message flow from one host/component to another host/component forms one system traffic flow) are mapped to the NoC grid at certain routes, whenever multiple flows intersect each other, an arbitration logic may be needed, and a router may therefore be instantiated if it does not already exist at the grid cell where the intersection occurs. Also new NoC channels can be allocated along the route if they do not already exist. Therefore, the key in determining the optimal NoC topology is to select an optimal route for all traffic flows in the system so that there are minimum number of intersection points and/or minimum number of channels while satisfying all traffic requirements.

According to another example implementation, a probability function can be calculated either considering one function based on latency, interconnect bandwidth, traffic flow or a summation of all functions, for a newly optimized position of the port or the host depending on the desired implementation.

Figure 7:
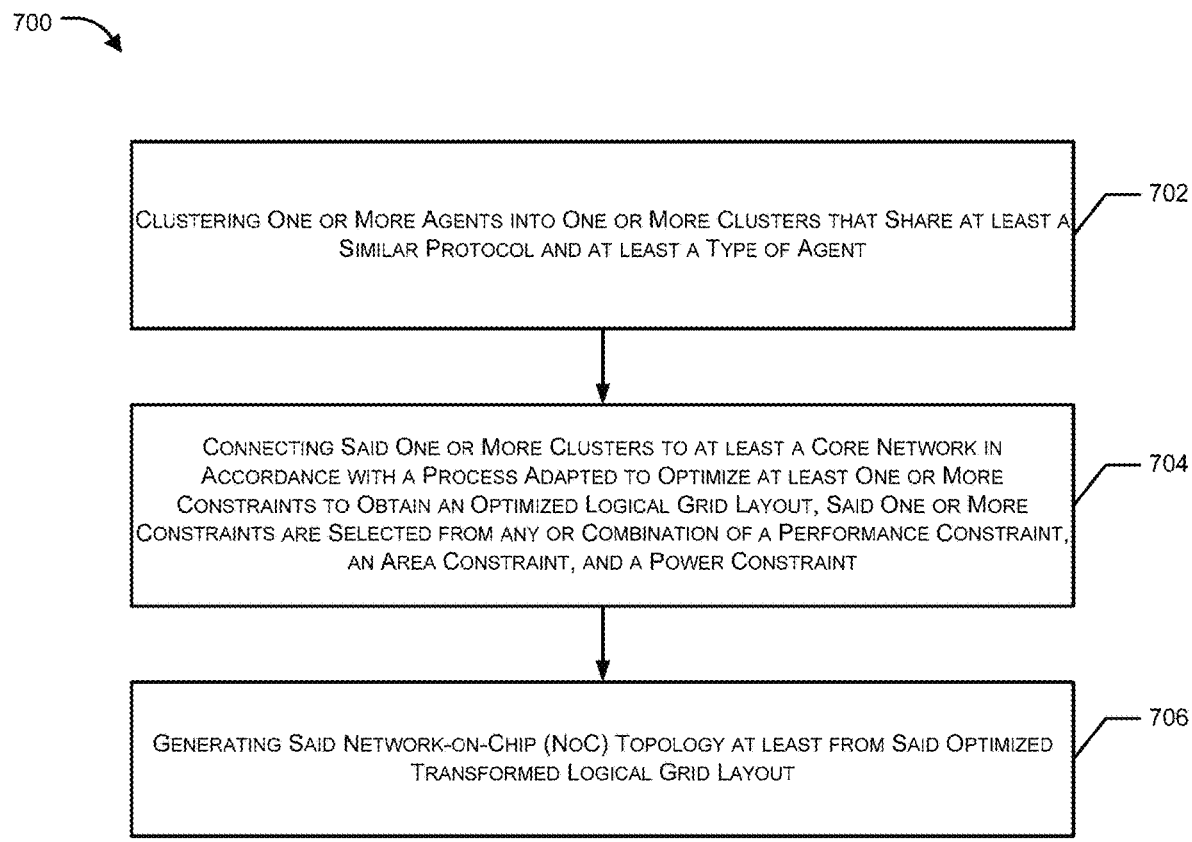
FIG. 7 illustrates an exemplary flow diagram for generating a Network-on-Chip (NoC) topology.

FIG. 7 illustrates an exemplary flow diagram 700 for generating a Network-on-Chip (NoC) topology. In an embodiment, the present disclosure relates to a method for generating a Network-on-Chip (NoC) topology. The method at step 702 clusters one or more agents into one or more clusters that share at least a similar protocol and at least a type of agent. The method at step 704 connects the one or more clusters to at least a core network in accordance with a process adapted to optimize at least one or more constraints to obtain an optimized logical grid layout, the one or more constraints are selected from any or combination of a performance constraint, an area constraint, a wiring constraint, a clocking (frequency) constraint, a routing constraint, and a power constraint. The method at step 706 generates the Network-on-Chip (NoC) topology at least from the optimized transformed logical grid layout.

In an example implementation, the clustering comprises addition of one or more crossbars. In another aspect, the clustering is based at least on any or combination of a connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

In an example implementation, the one or more clusters are formed based at least on a native as sent protocol, wherein the core of the one or more clusters is a NoC protocol. In an aspect, In an example implementation, the similar protocol comprises one or more shared bridges and/or one or more sizing buffers.

In an example implementation, the crossbars are adapted to determine one or more characteristics associated with the router. The one or more characteristics are selected from any or combination of radix information associated with a router, an arbitration frequency information associated with the router, a position information associated with the router, a clock information associated with the router, and a with information associated with the router.

In an example implementation, the crossbars are adapted to determine one or more characteristics associated with the router based on simulated annealing. In an aspect, the simulated annealing is configured to connect a plurality of ports associated with the router and determine total number of ports associated with the router.

In an example implementation, the crossbars are adapted to connect with one or more routers utilizing one or more ports associated with a router. In an aspect, the connection minimizes any or combination of total number of ports associated with the router used, total number of clock crossing logic utilized, distance between two routers, wire length for connection the two routers, total number of wires required for connection the two routers, and any logic used for communication between two routers.

In an example implementation, the crossbars are adapted to optimize bandwidth associated with a core network to maximize bandwidth.

Figure 8:
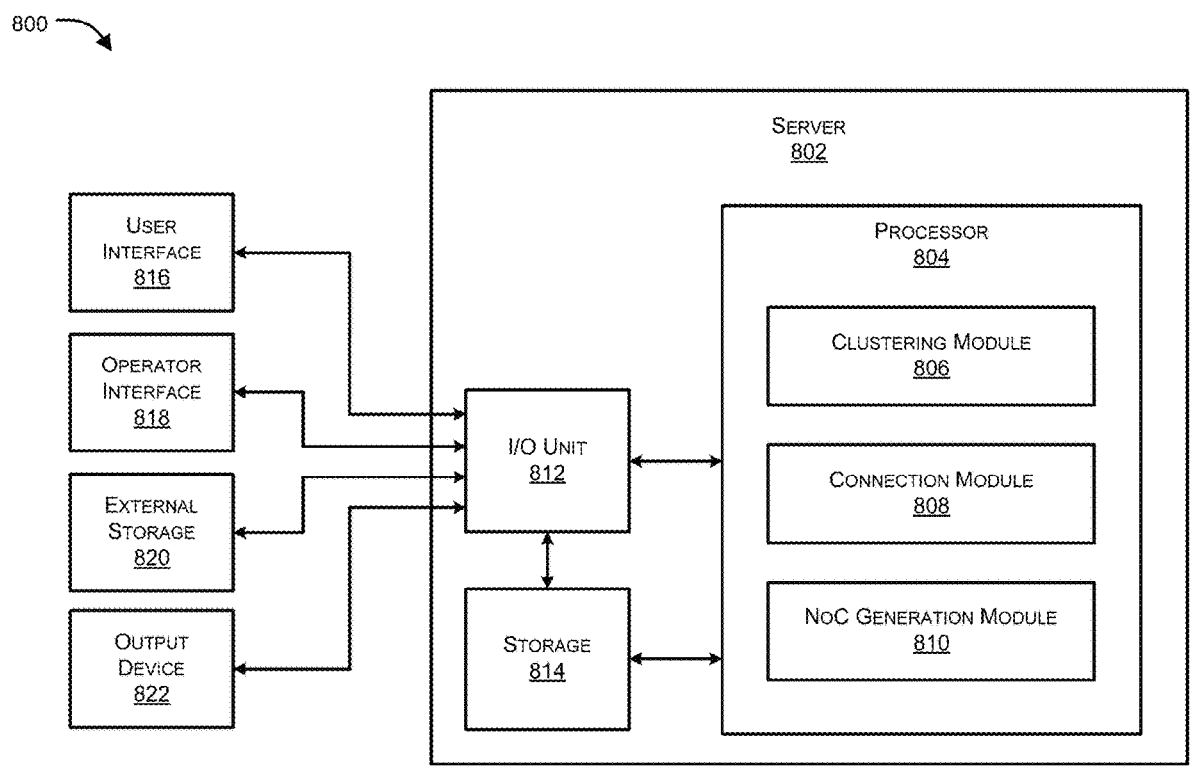
FIG. 8 illustrates an example computer system on which example embodiments may be implemented.

FIG. 8 illustrates an example computer system 800 on which example embodiments may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 800 includes a server 802 that may involve an I/O unit 812, storage 814, and a processor 804 operable to execute one or more units as known to one skilled in the art. The term "computer-readable medium" as used herein refers to any medium that participates in providing instructions to processor 804 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 816 and operator interfaces 818 which may utilize input devices such as a keyboard, mouse, touch device, or verbal command The server 802 may also be connected to an external storage 820, which can contain removable storage such as a portable hard drive, optical media (CD or DVD), disk media or any other medium from which a computer can read executable code. The server may also be connected an output device 822, such as a display to output data and other information to a user, as well as request additional information from a user. The connections from the server 802 to the user interface 816, the operator interface 818, the external storage 820, and the output device 822 may via wireless protocols, such as the 802.11 standards, Bluetooth® or cellular protocols, or via physical transmission media, such as cables or fiber optics. The output device 822 may therefore further act as an input device for interacting with a user.

The processor 804 may execute one or more modules including a clustering module to cluster one or more agents into one or more clusters that share at least a similar protocol and at least a type of agent, a connection module configured to connect the one or more clusters to at least a core network in accordance with a process adapted to optimize at least one or more constraints to obtain an optimized logical grid layout, and an NoC generation module configured to generating the Network-on-Chip (NoC) topology at least from the optimized transformed logical grid layout.

In an aspect, the one or more constraints are selected from any or combination of a performance constraint, an area constraint, a wiring constraint, a clocking (frequency) constraint, a routing constraint, and a power constraint.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for generating a Network-on-Chip (NoC) topology, said method comprising:
   clustering one or more agents into one or more clusters, wherein each of the one or more clusters is to include agents that share at least an agent type as well as at least a protocol;
   connecting said one or more clusters to at least a core network in accordance with a process adapted to optimize at least one or more constraints to obtain an optimized logical grid layout, said one or more constraints comprising at least an area constraint; and
   generating said Network-on-Chip (NoC) topology based on said optimized logical grid layout, wherein said clustering is based on at least one of: connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

2. The method of claim 1, wherein clustering said one or more agents into one or more clusters further comprises adding one or more crossbars.

3. The method of claim 1, wherein said one or more clusters are formed based at least on a native as sent protocol, wherein the core network of said one or more clusters operates on a NoC protocol.

4. The method of claim 1, wherein the protocol is to be utilized by one or more shared bridges and one or more sizing buffers.

5. The method of claim 2, wherein said crossbars are configured to determine one or more characteristics associated with the router, said one or more characteristics comprising at least one or more of: radix information associated with a router, arbitration frequency information associated with the router, position information associated with the router, clock information associated with the router, and width information associated with the router.

6. The method of claim 5, wherein said crossbars are configured to determine said one or more characteristics associated with the router based on a simulated annealing process, said simulated annealing process comprising connecting a plurality of ports associated with the router and determining a total number of ports associated with the router.

7. The method of claim 2, wherein said crossbars are configured to connect with one or more routers utilizing one or more ports associated with a router.

8. The method of claim 7, wherein connections from said crossbars are generated to minimize at least one of a total number of ports associated with the router used, a total number of clock crossing logic utilized, distance between two routers, wire length for connecting said two routers, total number of wires required for connecting said two routers, and logic utilized for communication between said two routers.

9. The method of claim 2, wherein said crossbars are configured to optimize bandwidth associated with the core network to maximize bandwidth.

10. The method of claim 1, wherein the one or more constraints comprise at least the area constraint and a wiring constraint.

11. A non-transitory computer readable medium storing instruction for generating a Network-on-Chip (NoC) topology, said instructions comprising:
   clustering one or more agents into one or more clusters, wherein each of the one or more clusters is to include agents that share at least an agent type as well as at least a protocol;
   connecting said one or more clusters to at least a core network in accordance with a process adapted to optimize at least one or more constraints to obtain an optimized logical grid layout, said one or more constraints comprising at least one or more of an area constraint; and
   generating said Network-on-Chip (NoC) topology based on said optimized logical grid layout, wherein said clustering is based on at least one of: connectivity information between two hosts in the optimized logical grid layout, clocking information associated with the optimized logical grid layout, power domain information associated with the optimized logical grid layout, data width information associated with the optimized logical grid layout, physical position information associated with the optimized logical grid layout, and bandwidth information associated with the optimized logical grid layout.

12. The non-transitory computer readable medium of claim 11, wherein clustering said one or more agents into one or more clusters further comprises adding one or more crossbars.

13. The non-transitory computer readable medium of claim 11, wherein said one or more clusters are formed based at least on a native as sent protocol, wherein the core network of said one or more clusters operates on a NoC protocol.

14. The non-transitory computer readable medium of claim 11, wherein said protocol is to be utilized by one or more shared bridges and one or more sizing buffers.

15. The non-transitory computer readable medium of claim 12, wherein said crossbars are configured to determine one or more characteristics associated with the router, said one or more characteristics comprising at least one or more of: radix information associated with a router, arbitration frequency information associated with the router, position information associated with the router, clock information associated with the router, and width information associated with the router.

16. The non-transitory computer readable medium of claim 15, wherein said crossbars are configured to determine said one or more characteristics associated with the router based on a simulated annealing process, said simulated annealing process comprising connecting a plurality of ports associated with the router and determining a total number of ports associated with the router.

17. The non-transitory computer readable medium of claim 12, wherein said crossbars are configured to connect with one or more routers utilizing one or more ports associated with a router.

18. The non-transitory computer readable medium of claim 17, wherein connections from said crossbars are generated to minimize at least one of a total number of ports associated with the router used, a total number of clock crossing logic utilized, distance between two routers, wire length for connecting said two routers, total number of wires required for connecting said two routers, and logic utilized for communication between said two routers.

19. The non-transitory computer readable medium of claim 12, wherein said crossbars are configured to optimize bandwidth associated with the core network to maximize bandwidth.

20. The non-transitory computer readable medium of claim 11, wherein the one or more constraints comprise at least the area constraint and a wiring constraint.

* * * * *